2,723,296

PRODUCTION OF FLUOROOLEFINIC COMPOUNDS

Irving Litant, Flushing, and Charles B. Miller, Lynbrook, N. Y., assignors to Allied Chemical & Dye Corporation, New York, N. Y., a corporation of New York No Drawing. Application April 21, 1954,
Serial No. 424,763

4 Claims. (Cl. 260—653)

This invention relates to the production of fluoroolefinic compounds by the reaction of 1,1-difluoroethane, $CH_3CHF_2$, with chlorine.

One object of this invention is provision of a process by practice of which it is possible to obtain from 1,1-difluoroethane excellent yields of fluoroolefinic compounds, particularly 1,1-difluoroethylene, $CH_2=CF_2$, and 1,1-difluoro-2,2-dichloroethylene, $CCl_2=CF_2$.

Another object of this invention is provision of a process whereby almost theoretical yields of 1,1-difluoroethylene are obtained from 1,1-difluoroethane.

Other objects will appear from the following description and examples.

The various reactions which may take place during the reaction of 1,1-difluoroethane with chlorine are represented by the following equations:

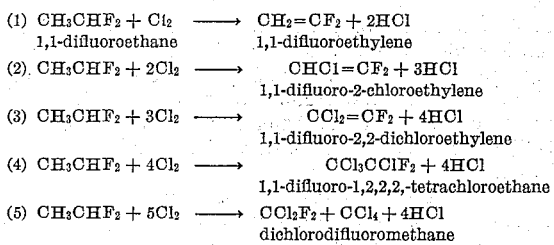

(1) $CH_3CHF_2 + Cl_2 \longrightarrow CH_2=CF_2 + 2HCl$
  1,1-difluoroethane        1,1-difluoroethylene (2) $CH_3CHF_2 + 2Cl_2 \longrightarrow CHCl=CF_2 + 3HCl$
                       1,1-difluoro-2-chloroethylene (3) $CH_3CHF_2 + 3Cl_2 \longrightarrow CCl_2=CF_2 + 4HCl$
                      1,1-difluoro-2,2-dichloroethylene (4) $CH_3CHF_2 + 4Cl_2 \longrightarrow CCl_3CClF_2 + 4HCl$
                    1,1-difluoro-1,2,2,2,-tetrachloroethane (5) $CH_3CHF_2 + 5Cl_2 \longrightarrow CCl_2F_2 + CCl_4 + 4HCl$
                          dichlorodifluoromethane We have found that excellent yields of fluoroolefinic compounds suitable for use as monomers, particularly 1,1-difluoroethylene and 1,1-difluoro-2,2-dichloroethylene may advantageously be obtained by reacting 1,1-difluoroethane with about 1.2 moles to 2.6 mols of chlorine per mol of 1,1-difluoroethane in the vapor phase at temperature in the range of about 550° to about 700° C. and in the presence of dichlorodifluoromethane, and recovering the fluoroolefinic compounds from the resulting reaction mixture.

We have further found that when the molecular ratio of chlorine to 1,1-difluoroethane is in the range of about 1.2 to 2.0:1, there is produced a gaseous reaction mixture containing a preponderant proportion of 1,1-difluoroethylene which may approach theoretical yield.

In the process of this invention a substantial proportion of the 1,1 difluoroethane reactant is rapidly converted to 1,1-difluoroethylene or 1,1-difluoroethylene and 1,1-difluoro-2,2-dichloroethylene, which compounds can be readily separated from the reaction mixture. Other chlorinated by-products, both unsaturated and saturated, are also formed which may be recovered and used for certain purposes. The desired product or products may be recovered from the reaction mixture by scrubbing the mixture with water, drying the scrubbed mixture, condensing the dried material and finally subjecting the condensed material to fractionation.

This invention is based on the discovery that under the prescribed conditions high conversion of 1,1-difluoroethane input is effected, and high yields of desired 1,1-difluoroethylene or 1,1-difluoroethylene and 1,1-difluoro-2,2-dichloroethylene products are obtained. The term "conversion" is used to indicate percent by weight of 1,1-difluoroethane charged which reacts during the course of the reaction, and "yield" is used herein to denote the percent by weight of 1,1-difluoroethane consumed which is converted to desired product or products.

In carrying out the process according to our invention, the gaseous reactants which may be separately vaporized and then mixed are passed into a suitable reactor wherein they are subjected to a temperature within the range of about 550° to about 700° C., and preferably about 625° to about 675° C., in the presence of dichlorodifluoromethane, for a period sufficient to bring about the desired reaction, and the desired product or products are separated from the resulting reaction mixture.

Exit gases from the reactor may be purified and the desired 1,1-difluoroethylene or 1,1-difluoroethylene and 1,1-difluoro-2,2-dichloroethylene recovered in any satisfactory manner. For example, the effluent of the reactor may be passed first through one or more water scrubbers which absorb most of the HCl, cool the gas stream and condense part of the high boiling materials which are formed during the reaction. Thereafter, the water-scrubbed gas may be passed through a soda-lime tower to remove traces of acid and then through a calcium chloride drying tower. There is thus produced a gas stream which contains principally 1,1-difluoroethylene (B. P. −83° C.) or principally that compound and 1,1-difluoro-2,2-dichloroethylene (B. P. 18.9° C.). There may also be present varying amounts of 1,1-difluoro-2-chloroethylene (B. P. −19° C.), dichlorodifluoromethane (B. P. −29.8° C.) and high boiling materials having B. P. >22° C. (principally 1,1-difluoro-1,2,2,2-tetrachloroethane). The constituents of this gas may be totally liquefied in a suitable receiver by cooling in a liquid nitrogen trap. Alternatively, condensation may be accomplished by cooling in a Dry Ice-acetone trap. In this case a portion of the gas consisting essentially of 1,1-difluoroethylene remains uncondensed and may be collected by suitable means. The receiver may then be transferred to a still and fractionally distilled in conventional manner to recover the desired constituents.

It has been found that carrying out the reaction in the presence of dichlorodifluoromethane brings about such a change in reaction conditions that greatly improved yields of 1,1-difluoroethylene or that compound and 1,1-difluoro-2,2-dichloroethylene are obtained. Although it is known that the dichlorodifluoromethane passes substantially unchanged through the reactor, the function and mechanics of the dichlorodifluoromethane are not clearly understood. It is believed, however, that the overall action of the dichlorodifluoromethane, from a practical standpoint, may be considered to be that of a true catalyst.

The quality of dichlorodifluoromethane utilized in practice of the invention process may vary over a relatively wide range. For general practical purposes, an amount in mol ratio of about 0.2 to 1.5 mols for each mol of 1,1-difluoroethane reactant at the reaction temperatures stated brings about excellent yields of desired product or products.

Mol ratios of chlorine to 1,1-difluoroethane reactant of about 1.2 to 2.6:1 yield the greatest quantities of 1,1-difluoroethylene or 1,1-difluoroethylene and 1,1-difluoro-2,2-dichloroethylene with minimum formation of undesirable products. In addition, use of such mol ratios avoids the presence of unreacted 1,1-difluoroethane which makes for a simpler operation. If excessive amounts of chlorine are employed, there is a tendency for formation of overchlorinated by-products. If too little chlorine is employed, the yield of the desired product or products is decreased and large amounts of unreacted 1,1-difluoroethane occur in the reaction mixture which must then be recycled. This impairs the efficiency of the process.

The temperature of reaction may vary from about 550° to about 700° C., and preferably is about 625° to about 675° C. No worth-while reaction appears to take place at a temperature appreciably below about 550° C., and, on the other hand, no significant operating advantages are obtained at temperatures above about 700° C.

Space velocities (volumes of reactant gas at S. T. P. per volume of reaction chamber per hour), while apparently not a wholly controlling factor, may lie in the range of 300 to 6000, and space velocities of 600 to 4000 have been found to be particularly suitable.

The process of this invention may be carried out in either a batch or continuous manner.

The following examples illustrate methods of carrying our invention into effect. In the examples parts are by weight.

*Example 1.*—A gaseous mixture consisting of 157 parts of 1,1-difluoroethane (2.38 mols), 217 parts of chlorine (3.6 mols) and 299 parts of dichlorodifluoromethane (2.47 mols) was fed into a reactor comprising an unpacked ½" x 31" nickel tube at a space velocity of 943. The temperature of the reactor was maintained at 650° C. The reacted gaseous mixture was passed from the reactor and was bubbled through a series of water scrubbers to remove HCl, cool the gases and condense some of the high boiling products. The gases were then passed through a soda-lime tower to remove traces of acid, dried in a calcium chloride tower and condensed in a Dry Ice-acetone trap. A portion of the gases consisting essentially of 1,1-difluoroethylene remained uncondensed, and its quantity was measured by passage through a wet gas test meter. The condensed material was then transferred to a fractionating still and the material distilled. 299 parts of dichlorodifluoromethane were recovered and recycled for use in the next run. Conversion of the 1,1-difluoroethane was substantially 100%. The products obtained were 147 parts of total 1,1-difluoroethylene (96.5% yield), 8 parts of 1,1-difluoro-2-chloroethylene (3.4% yield), 10.6 parts of 1,1-difluoro-2,2-dichloroethylene (3.4% yield) and 10.1 parts of high boiling materials (2.1% yield as 1,1-difluoro-1,2,2,2-tetrachloroethane).

The run was continued for an operating period of 1½ hours, at the end of which the reactor was substantially free of carbonaceous deposit. In a run using similar reaction conditions but in the absence of dichlorodifluoromethane, carbonization plugged the reactor after about 12 minutes, and the run was stopped.

*Example 2.*—A gaseous mixture consisting of 154 parts of 1,1-difluoroethane (2.34 mols), 446 parts of chlorine (6.3 mols) and 297 parts of dichlorodifluoromethane (2.46 mols) was fed into a reactor comprising an unpacked ½" x 31" nickel tube at a space velocity of 1320. The mixture of gases was then treated in accordance with the procedure outlined in Example 1. Conversion of the 1,1-difluoroethane was substantially 100%. The products recovered were 42.6 parts of 1,1-difluoroethylene (28.5% yield), 123.1 parts of 1,1-difluoro-2,2-dichloroethylene (39.7% yield), 15 parts of 1,1-difluoro-2-chloroethylene (6.5% yield), 76.5 parts of high boiling materials (16.1% yield as 1,1-difluoro-1,2,2,2-tetrachloroethane) and 24 parts dichlorodifluoromethane (9.0% yield). As noted, under the conditions of this example a small amount of the 1,1-difluoroethane was converted into dichlorodifluoromethane. This material was combined with the dichlorodifluoromethane introduced at the beginning of the reaction and was recycled for use in a subsequent run.

While the above examples describe the preferred embodiments of our invention, it will be understood that departures may be made therefrom within the scope of the specification and claims.

We claim:

1. A process for preparing difluoroolefinic compounds which comprises subjecting a vaporous mixture of 1,1-difluoroethane and about 1.2 to 2.6 molecular proportions of chlorine to temperature of about 550° to about 700° C. in the presence of dichlorodifluoromethane and recovering the difluoroolefinic compounds from the resulting reaction mixture.

2. A process for preparing difluoroolefinic compounds which comprises subjecting a vaporous mixture of 1,1-difluoroethane and about 1.2 to 2.6 molecular proportions of chlorine to temperature of about 625° to about 675° C. in the presence of about 0.2 to 1.5 molecular proportions of dichlorodifluoromethane, and recovering the difluoroolefinic compounds from the resulting reaction mixture.

3. A process for preparing 1,1-difluoroethylene which comprises subjecting a vaporous mixture of 1,1-difluoroethane and 1.2 to 2.0 molecular proportions of chlorine to temperature of about 550° to about 700° C. in the presence of dichlorodifluoromethane, and recovering the 1,1-difluoroethylene product from the resulting reaction mixture.

4. The process for preparing 1,1-difluoroethylene which comprises subjecting a vaporous mixture of 1,1-difluoroethane and 1.2 to 2.0 molecular proportions of chlorine to temperature of about 550° to about 700° C. in the presence of 0.2 to 1.5 molecular proportions of dichlorodifluoromethane, and recovering the 1,1-difluoroethylene product from the resulting reaction mixture.

References Cited in the file of this patent

UNITED STATES PATENTS 2,572,913     Calfee et al. _____ Oct. 30, 1951